(12) United States Patent
Kramer et al.

(10) Patent No.: US 8,978,008 B2
(45) Date of Patent: *Mar. 10, 2015

(54) SOFTWARE CONFIGURATION CONTROL WHEREIN CONTAINERS ARE ASSOCIATED WITH PHYSICAL STORAGE OF SOFTWARE APPLICATION VERSIONS IN A SOFTWARE PRODUCTION LANDSCAPE

(71) Applicants: Wolfram Kramer, Heidelberg (DE); Uwe Krueger, Karlsruhe (DE)

(72) Inventors: Wolfram Kramer, Heidelberg (DE); Uwe Krueger, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/282,418

(22) Filed: May 20, 2014

(65) Prior Publication Data

US 2014/0258984 A1 Sep. 11, 2014

Related U.S. Application Data

(63) Continuation of application No. 12/332,626, filed on Dec. 11, 2008, now Pat. No. 8,776,020.

(51) Int. Cl.
*G06F 9/44* (2006.01)
(52) U.S. Cl.
CPC .......................................... *G06F 8/71* (2013.01)
USPC ........................... 717/121; 717/109; 717/122
(58) Field of Classification Search
USPC .......... 717/109, 121–167; 709/208, 218, 232, 709/244; 711/160, 163, 201
See application file for complete search history.

(56) References Cited

U.S. PATENT DOCUMENTS

| 5,675,802 | A  | * | 10/1997 | Allen et al. | ................... | 717/103 |
| 7,603,393 | B1 | * | 10/2009 | Cote et al. | ............................. | 1/1 |
| 7,694,277 | B2 | * | 4/2010 | Yuknewicz et al. | ........... | 717/121 |
| 2004/0015866 | A1 | * | 1/2004 | Estep et al. | .................... | 717/124 |
| 2008/0148235 | A1 | * | 6/2008 | Foresti et al. | ................. | 717/123 |

OTHER PUBLICATIONS

Reidar Conradi; Version models for software configuration management; ACM, vol. 30 Issue 2, Jun. 1998, pp. 230-282.*
Jacky Estublier; Software configuration management: a roadmap; ACM New York, NY, USA 2000; pp. 279-289.*
Bersoff, Edward H.;, "Elements of Software Configuration Management," Software Engineering, IEEE Transactions on, vol. SE-10, No. 1, Jan. 1984, pp. 79-87.*

* cited by examiner

*Primary Examiner* — Satish Rampuria
(74) *Attorney, Agent, or Firm* — Buckley, Maschoff & Talwalkar LLC

(57) ABSTRACT

According to some embodiments, a source version of a software product may be established in connection with a software production landscape. A first container, representing a first uniquely addressable physical location in the software production landscape, may then be associated with the source version. An executable derivative version of the software product may be built from the source version, and a second container, representing a second uniquely addressable physical location in the software production landscape, may be associated with the executable derivative version. Software configuration information may then be automatically provided to a user based at least in part on a relationship between the first and second containers at a given point in time.

26 Claims, 5 Drawing Sheets

SOFTWARE CONFIGURATION CONTROL WHEREIN CONTAINERS ARE ASSOCIATED WITH PHYSICAL STORAGE OF SOFTWARE APPLICATION VERSIONS IN A SOFTWARE PRODUCTION LANDSCAPE

CROSS REFERENCE TO RELATED APPLICATION

This is a continuation of U.S. patent application Ser. No. 12/332,626, filed Dec. 11, 2008, now issued as U.S. Pat. No. 8,776,020.

FIELD

Some embodiments of the present invention may relate to software configuration control across a software production landscape. In particular, some embodiments may comprise systems and methods providing software configuration control wherein containers are associated with physical storage of software application versions in a software production landscape.

BACKGROUND

The development of a software product may involve the creation of a number of different versions of the product and portions of the product. For example, developers may periodically modify and update portions of the source code of the software product to improve functionality and/or to correct errors in the product as they are discovered. In some cases, different developers will work on portions of the same software product in parallel.

A Software Configuration Management (SCM) tool may help maintain, track, and distribute different versions of the source code. For example, one developer might use the SCM tool to ensure that he or she is accessing the latest version of a source code routine before making any changes.

Although an SCM tool may help track different versions of source code, in some cases this information may not be sufficient to allow for the development of a software product in a complex software production landscape. For example different versions of source code might be used to create different executable versions, which in turn might be distributed to testing environments and/or production systems. As a result, it can be difficult to track different versions of an application in a software development and production process.

Approaches that may improve the ability to maintain, track, and distribute different versions throughout a software production landscape could, therefore, be desirable. Moreover, it may advantageous to provide one or more tools that facilitate these abilities in an efficient and convenient manner.

DETAILED DESCRIPTION

Figure 1:
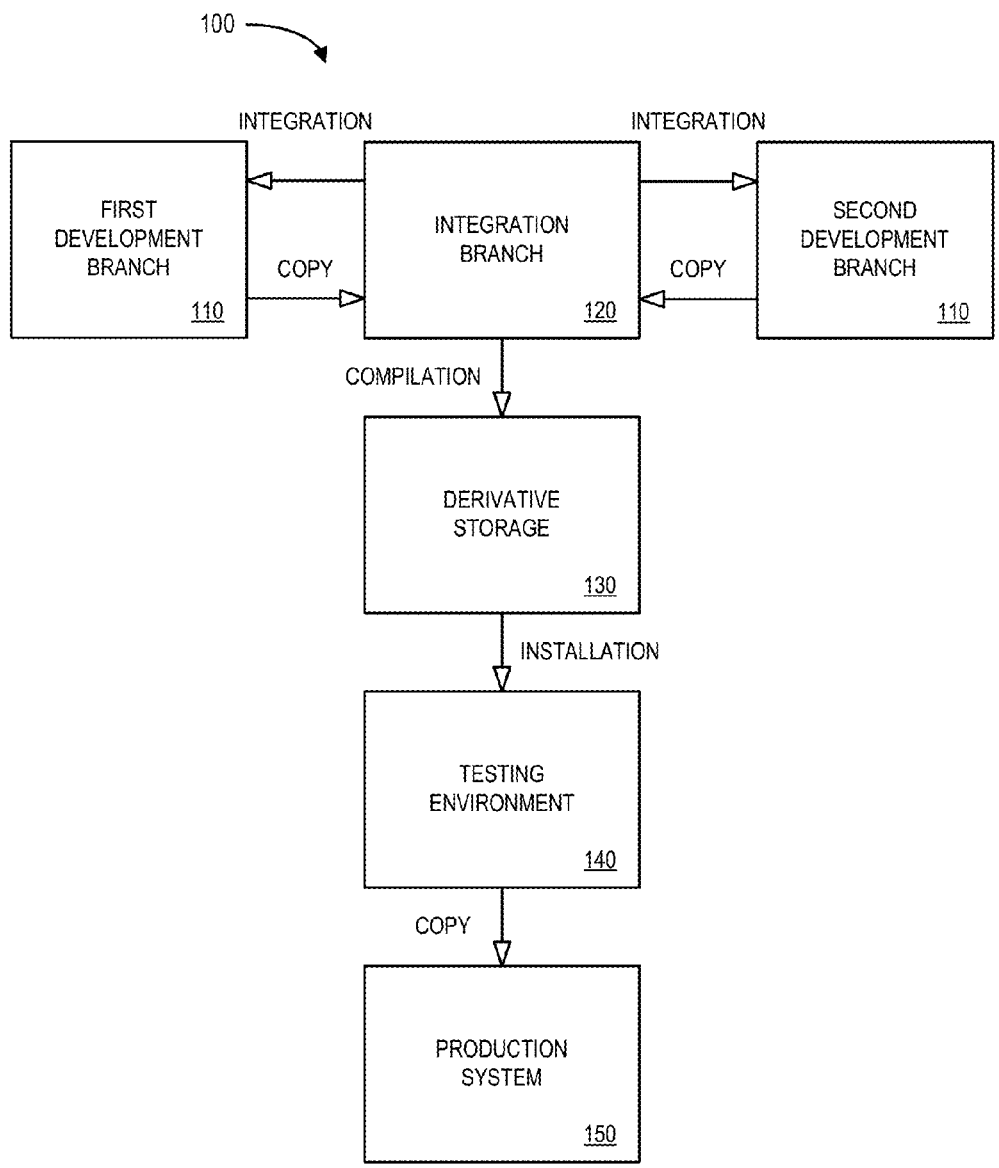
FIG. 1 is a block diagram of a software production landscape according to some embodiments.

To alleviate problems inherent in the prior art, some embodiments of the present invention introduce systems, methods, computer program code, and means providing software configuration control wherein containers are associated with physical storage of software application versions in a software production landscape. For example, FIG. 1 is a block diagram of a software production landscape 100 according to some embodiments. The landscape 100 may include one or more development branches 110 that provide code associated with a software application to an integration branch 120. The development branches 110 may also retrieve copies of code associated with the software application from the integration branch 120.

The integration branch 120 may coordinate the exchange and integration of source code portions and compile code received from the development branches 110. The integration branch 120 may then provide a compiled version of the software application to a derivative storage unit 130

The derivative storage unit 130 may store different versions of a software application may further provide an installation copy of the software application to a testing environment 140. The testing environment 140 may, for example, be used to look for problems with the software application. The testing environment 140 may further provide a copy of the software application to one or more remote production systems 150. A production system 150 may, for example, be associated with a client or customer enterprise system that executes the software application in a business environment.

Note that elements described herein as communicating with one another may be directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between remote systems may proceed over any one or more transmission protocols that are or become known, such as Asynchronous Transfer Mode (ATM), Internet Protocol (IP), Hypertext Transfer Protocol (HTTP), and/or Wireless Application Protocol (WAP). Although a single integration branch 120 is illustrated in FIG. 1, note that any number of integration branches 120, as well as the other elements described herein, may be provided.

Note also that some or all of the devices illustrated in FIG. 1 (as well as the other systems described herein) may use processor-executable program code read from one or more of a computer-readable medium, such as a floppy disk, a CD-ROM, a DVD-ROM, a magnetic tape, and a signal encoding the process, and then stored in a compressed, uncompiled and/or encrypted format. Note that embodiments are not limited to any specific combination of hardware and software.

Figure 2:
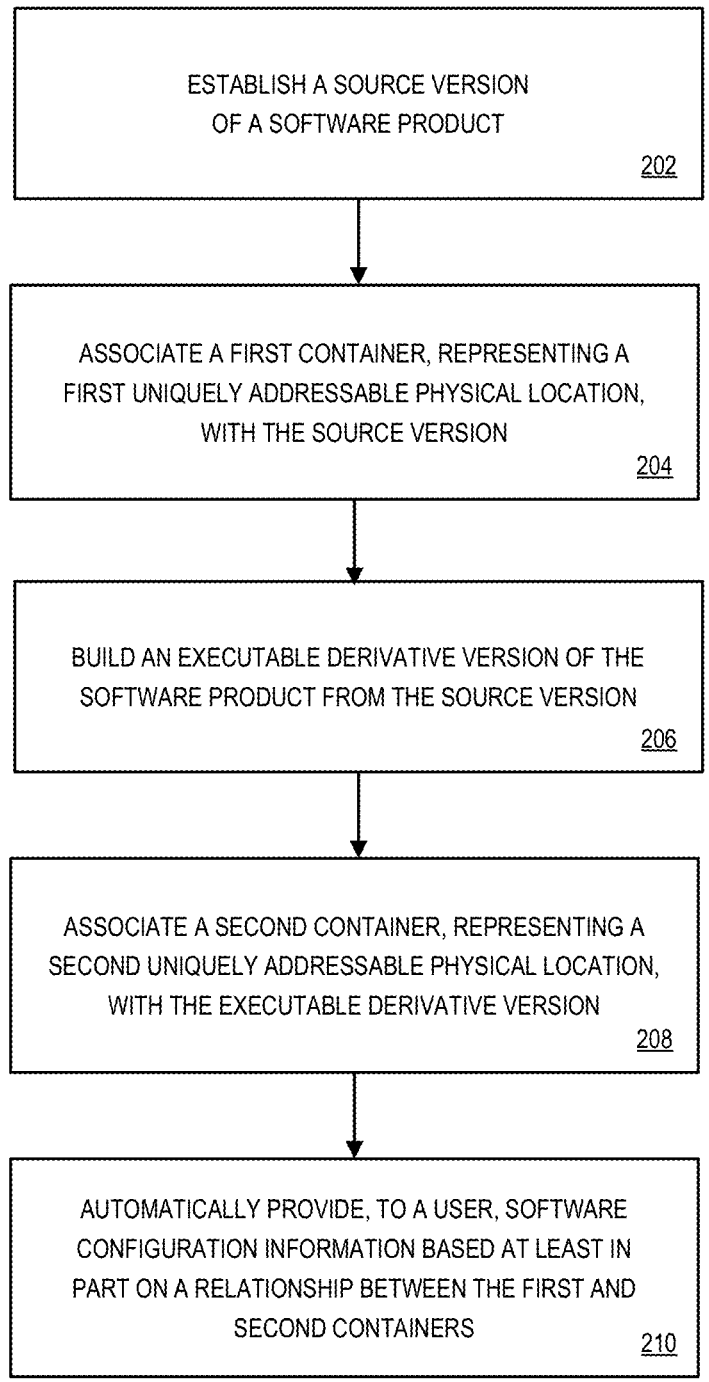
FIG. 2 is a flow diagram of a method pursuant to some embodiments of the present invention.

FIG. 2 is a flow diagram of a method pursuant to some embodiments of the present invention. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 202, a source version of a software product may be established. For example, an integration branch of a software product landscape may establish a source version of the software product. At 204, a first "container," representing a first uniquely addressable physical location in the software production landscape, may be associated with the source version.

As used herein, the term "container" may refer to, for example, a branch in a SCM tool and/or any other location where software versions or snapshots may be found. Such a container may represent, for example, a generalization of software configuration management branches or streams. Moreover, containers may provide a unified description of an infrastructure covering the notion of branches typically used in software configuration management tools as well as infrastructure elements that are outside the control of typical SCM tool (e.g., including build result locations, replication locations, and/or test systems).

At 206, an executable derivative version of the software product may be built from the source version. A second container, representing a second uniquely addressable physical location in the software production landscape, may then be associated with the executable derivative version at 208.

At 210, software configuration information may be provided to a user based at least in part on a relationship between the first and second containers at a given point in time.

Note that typical SCM tools track different versions of source code (or source code portions). However, the management of source code alone might be insufficient to effectively produce a complex software product. For example, there may be many intermediate steps between the source code and the final product that is executed by a customer (and different steps might be spread across the infrastructure of the production landscape).

In such an environment, the development of the product may start with the source code, and then include the compilation of sources (build) and packaging of compilation results into archives or libraries or—more in a more general respect—"derivates" that can be executed on a given platform.

Some prominent examples include a pure operating system or an application server. Within the development process, such a platform may be used mainly for testing purposes. Typically, however, governance of the SCM tool ends before the generation step begins. Unique identification of a software snapshot provided by a SCM tool is therefore restricted only to sources. That is, an adequate standardized solution for derivates (e.g., located in a generation directory or on a runtime environment) that enables their unique identification is missing. Operators of software development processes may therefore be forced to establish their own solutions for identifying derivates. In some cases, metadata, generated into the derivates, can provide information about the generation process and/or the underlying source snapshot. In the latter case, depending on the access methodologies of the SCM tool, a time stamp or a sequence number identifying the source snapshot, a label or a Uniform Resource Locator (URL) may be used.

However, the annotation of derivates may only be a workaround for determining which source code the entities found on the derivate folder or on the test system came from. Note that a derivate snapshot may have its own identity, but is on the other side correlated to the source snapshot from which it was originally generated. This correlation may provide the cleanest information about the identity of derivates (e.g., it may be assumed that properties of derivates are determined by the sources).

In relatively small software projects, the problem of identifying derivate snapshots on generation directories or in runtime environments might be manageable. But in larger projects, where parallel development plays a role, the situation may become impractical. For example, the increasing number of snapshots that do not consist of sources (and therefore are not under SCM tool control) may result in confusion.

According to some embodiments, the principles of SCM tools based on source control are applied to derivates. For that, a unified model that abstracts over the description of sources and derivates may be helpful. A prerequisite for such a model may be a concept of formalizing the physical storage of snapshots, not affected by the fact whether they consist of sources or of derivates.

As used herein, an "entity" may refer to a software object that possesses an identity that is independent of time. An entity may have arbitrarily many content-bearing instances called "versions" of the entity. Note that a version might have an identity that is also independent of time. Once created, a version might be un-modifiable. Examples of entities include files, directories, and row entries in a database. A version of an entity may reflect the content of the entity under consideration of access context and time. Note that this definition is similar to the notion of version as it is applied to SCM tools. But the idea of a version as described herein goes further since it does not differentiate between sources and generation results hence derivates.

Examined on the level of versions, a generation step may be described as follows: it uses a set of input versions for creating versions of other entities. Therefore, it realizes an n:m relationship between input versions and generated output versions. A version that is a target of at least one generation relationship is referred to herein as a derivate version. A version that is not target of any generation relationship is referred to as a source version. To be a source may be a property of the version alone (not of the entity). Also note that an entity may contain both source and derivate versions. Moreover, it may be the case that a source version has a derivate version as successor and vice versa.

The identity of a source version may be defined by a SCM tool. The identity of a derivate version is determined by the identities of all source versions that are reached by—perhaps transitive—backtracking of generation relationships starting from the derivate version.

As used herein, a "version set" is a set of versions with the property that any entity is represented by at most one version:

$$S = \{V_{\alpha 1}(E_1), \ldots, V_{\alpha n}(E_n)\}$$

with $$\forall i \neq j : E_i \neq E_j$$

where the $E_k$ run through all entities that participate in the software product and $V_{\alpha m}(E_m)$ is the version of $E_m$ identified by index $\alpha m$. It may be avoided within a version set that different versions of the same entity conflict with each other.

An inherent task of a SCM tool may be to provide configurations. Thus, an SCM tool may be able to inform about version sets of a software product and to provide version sets (as already described, that ability is in general restricted to sources). Starting from these considerations, the terminology of a container can now be further described according to some embodiments.

A container may represent a uniquely addressable physical location that provides access to versions. The whole of the versions that are accessible in a container at a given point of time may form a version set. To illustrate the concept, consider the following examples:

A directory within an SCM tool which hosts source snapshots of a software product may represent a container. The versions that are directly accessible are the current versions.

A label defined in an SCM tool may represent a container. Via the label, source versions of a snapshot may be accessible that needs not to be the current source snapshot of the software product.

A directory within an SCM tool together with a time stamp may be equivalent to a label. The container offers access to the source versions of the software product that were current at the given time stamp.

Two branches within an SCM tool that are used for the same software product for maintaining two releases or to enable development in two parallel development lines, are two different containers.

The centrally accessible directory into which the build server places generation results (based on a given source snapshot) may represent a container. That is, it contains derivate versions but may also contain source versions (most commonly those which the derivate versions were generated from).

A directory into which the already generated derivate versions are copied in a post-build step for the purpose of providing developers in a distributed landscape with the newest build results. This directory may also represent a container.

A runtime environment where the generated derivates are executed may represent a container.

As used herein, a version set that is accessible via a container is in the sequel called snapshot. Thus, containers may represent physical storages of snapshots. Moreover, a snapshot can be interpreted as version of an aggregated (logical) entity as follows: whenever a version that is accessible via a container is replaced by another version of the same entity, a new snapshot is created and therefore a new version of the aggregated entity. Besides the direct accessible current snapshot, the container may also contain all predecessor snapshots. The accessibility to snapshots that are not current by using a specified time stamp may depend on the explicit implementation of the container.

A snapshot is able to contain source versions, derivate versions, or both types of versions. According to some embodiments, a snapshot may embrace the whole software product (the aggregated entity whose version can be interpreted as the snapshot represents a state of the whole product). Note that a container in principle could host a version set that does not cover the whole product (but instead only a component out of it).

Note that by way of example, an entity might represent the whole of all sources of the software product or the whole of derivates of the software product as a representation of a completely generated, ready to run product. As other examples, an entity might represent any possible intermediate states between those two extremes. Although these different types of entities may represent the same product (each in a different manner), they have different identities (that is, a derivate may be differentiated strictly from its underlying source).

Typically, central production processes operate on snapshots of the whole source base of a software product, and a central generation process uses a source snapshot of the whole product to produce a derivate snapshot of the whole product. This aspect can be formalized in the following way: a "transformation" is an operation that uses read access to a snapshot in an input container for producing a new current snapshot in an output container. Note the possibility that a source container and an output container may be identical. If, after finishing the transformation the input snapshot is identical to the output snapshot, the transformation is called a "transport."

One example of a transformation is a central build process. In this case, the input container is the directory of sources of the software product hosted by the SCM tool, and the output container is the central file system directory for the derivates. Another example of a transformation is a "local C make." A special feature in this case is the fact that the compilation results normally are generated into the source directory. Thus, the input container and output container are identical. The newly created snapshot contains both the source versions of the input snapshot and additionally the derivate versions. Still another example of a transformation is a local build done by in a development environment. Depending on the development environment, this example may also apply to technologies other than C/C++ (e.g., to Java development with Eclipse).

As another example of a transformation, consider the creation of a label in an SCM tool. In this case, no new versions are created and therefore no new snapshot is generated. An already existing snapshot is marked by the label—thus it becomes the current snapshot in the container defined by the label. This is one example of a "transport" transformation.

Yet another example of a transformation might be the integration of a source snapshot from one branch in an SCM tool into another branch without occurrence of conflicts. Formally, this may be considered a transport because the contents of the input snapshot and the output snapshot are identical. From a technical point of view, it may depend on the implementation of the SCM tool (that is, whether the identity of versions is preserved or new versions are created in the output branch). Other examples of transformations may include integration of a source snapshot from one branch in an SCM tool into another branch with occurrence of conflicts and a manual resolving of conflicts and an installation of executable derivates on a runtime environment (when the input container is the central derivate directory and the output container is the runtime instance).

According to some embodiments, problems associated with process tracking that may arise when operating an infrastructure landscape for software development are addressed using containers as a universal description of infrastructure elements that serve as physical access to versions of the software product. Such containers may be used to help a user monitor and track production processes.

Figure 3:
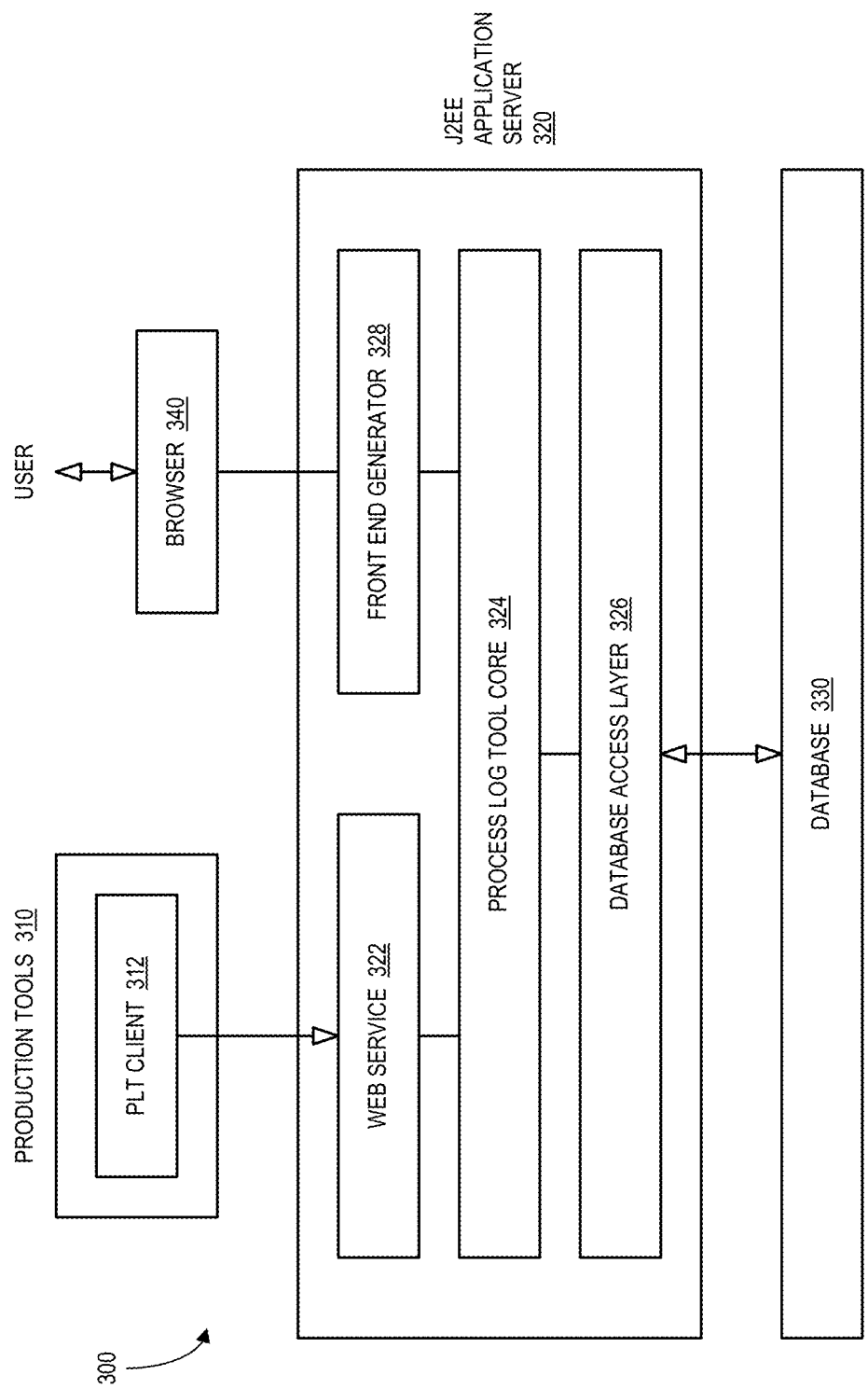
FIG. 3 is a block diagram of a process log tool architecture according to some embodiments.

For example, FIG. 3 is a block diagram of a process log tool architecture 300 according to some embodiments. The architecture 300 includes production tools 310 (including a process log tool client 312) that provide information to a J2EE application server 320 via a web service 322. The web service 322 communicates with a process log tool core 324, which in turn can access a database 330 via a database access layer 326. A user may access a browser 340 to communicate with the application server 320. In particular, the server 320 exchanges information from the browser 340 via a front end generator 328.

Note that an infrastructure landscape that is used for the production of a software application may be relatively inhomogeneous (e.g., for historical reasons). For example, a multitude of different tools may be applied for executing single process steps in the whole production process chain. In this case, the application server 320 may help ensure a process recording within such a non-homogenous tool landscape.

Thus, all tools involved in the production landscape may be able to send process information to that application server 320 using an API.

Figure 4:
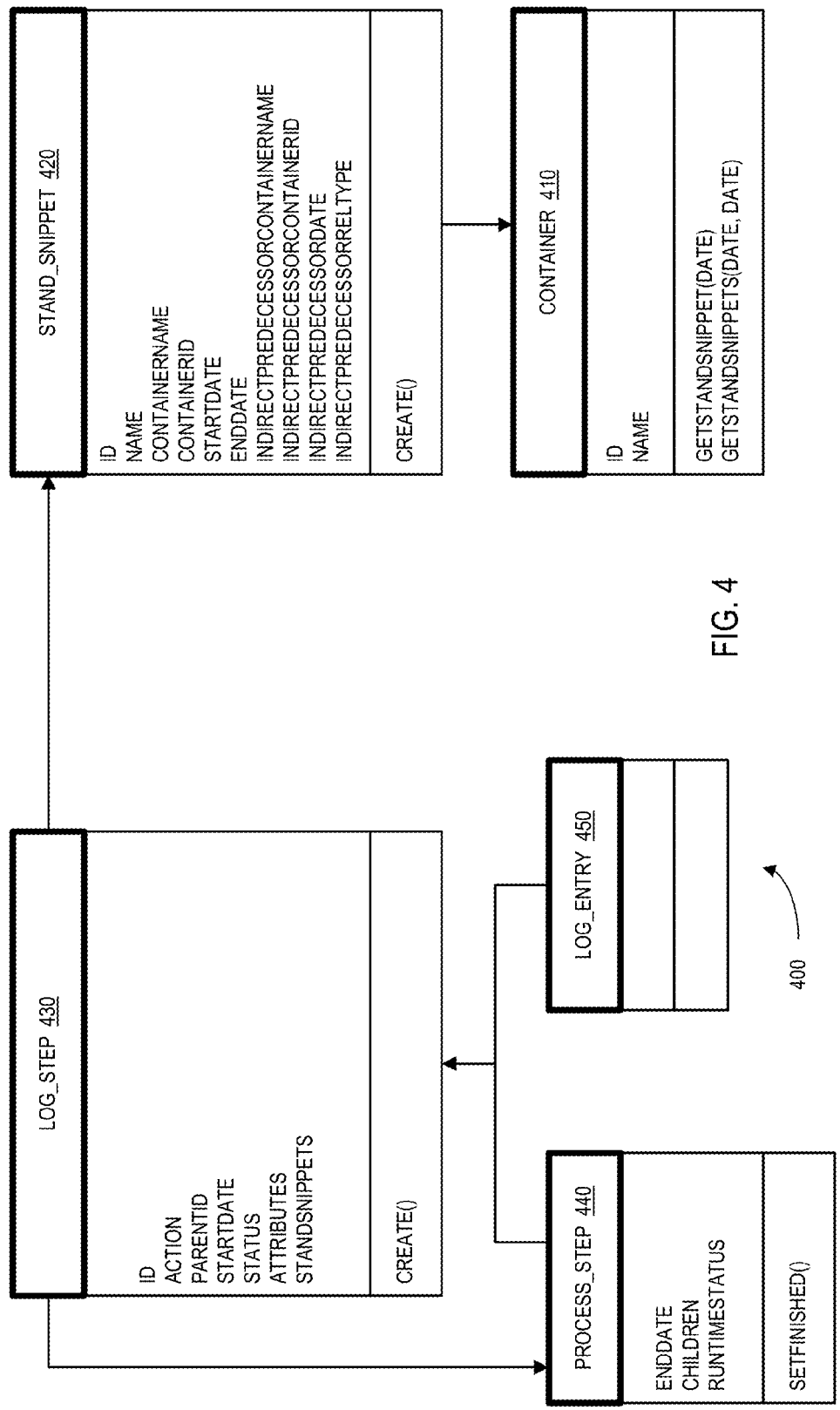
FIG. 4 illustrates a process log tool data model according to some embodiments.

A data model 400 that might be used by the application server 320 is illustrated in FIG. 4. In the class diagram, getter and setter methods are omitted for clarity. The model 400 includes a container element 410, a stand snippet element 420, a log step element 430, a process step element 440, and a log entry element 450

According to some embodiments, all objects in a database may be identified by a Globally Unique Identifier (GUID). Moreover, a central object is the stand snippet (class StandSnippet) that is assigned to a container. The identification of a container within a stand snippet might be done, for example, either by providing its GUID or by name. The latter is unique in the overall set of containers. That has the advantage to be able to work with meaningful container names that correspond, for example, to branch names in a version control system.

A stand snippet object 420 may have a central method, namely create( ), that persists the object attributes set by setter methods. The container 410 to which the stand snippet is 420 associated can be give by GUID (containerId) or by its name (containerName). If the container 410 is not yet known to the database, it may be automatically created within the create( ) method of the stand snippet 420.

Synchronously with the creation of a new stand snippet 420, its attribute StartDate may be set to the current time. The attribute endDate of the former current stand snippet 420 in the container 410 is set to the same date. By that, the role of being the current stand snippet 420 may also switch from the former stand snippet to the newly created one.

The indirect predecessor of the stand snippet is given by the indirect predecessor container (indirectPredecessorContainerID or indirectPredecessorContainerName) and the reference time (indirectPredecessorTime). The type of the underlying transformation (it may be, for example, an integration step within the version control system or a compilation) may be visible through the attribute indirectPredecessorRelType. Note that the indirect predecessor data are optional as a whole. That means, the stand snippet 420 may have no indirect predecessor.

Log entries 450 (class LogEntry) and process steps 440 (class ProcessStep) inherit form a common superclass LogStep. The main features are common to log entries 450 and process steps 440: the create( ) persists the data to the database. The attribute action contains a textual description of the process or log entry. This may give the user of the process log tool an idea of the process step 440 or the log entry 450. More detailed information that such an object shall provide is specific to the situation. Therefore, a generic vector attribute may be provided that is able to hold arbitrary parameter-value pairs. In this way, every production tool that creates a process step 440 or a log entry 450 in the process log tool is able to provide specific data as appropriate.

According to some embodiments, log entries 440 and process steps 450 are always associated to one or more stand snippets 420. The vector standSnippets stores a references to those. In addition, any log entry 440 and any process step 450 may be a child or a higher-level process step 440. The attribute parentId references to the parent process step 440 of by its GUID. Vice versa, a process step 440 may be able to inform about its child process steps 440 and log entries 450.

Finally, any log entry 450 and any process step 440 has a creation date startDate and a status that reports about the execution success within the notifying production tool. Possible values might include success, warning, error, and/or information. Note that the class log entry 450 may be similar to the class log step 430.

The class process step 440 in addition has its own attribute (runtimeStatus). In contrast to the log entry 450 that represents a temporally punctual event, the process step 440 has a temporal expansion due to the time that is required for process execution on the production tool side. During the execution of the process step 440, the value of the attribute runtimeStatus may have the value of "running" and after the process step 440 termination the value "finished." The termination of the process step 440 is triggered by the call of method setFinished. This is the only case when an already created object may be altered. The process step 440 that needs to be finished might be, for example, identified by its GUID.

Messages and process steps may, according to some embodiments, be derived from a common super class named process message. This is due to the essential property common to both, namely the ability to be booked to one or two stand snippets. The property of process steps to act as bracket around messages or sub process steps is realized by an optional attribute of the class process message that contains a reference to the parent process step.

Figure 5:
FIG. 5 illustrates a graphical user interface that may be associated with a process log tool according to some embodiments.

According to some embodiments, an end user desiring information about process history may log on to an application using a Graphical User Interface (GUI) display 500 illustrated in FIG. 5.

In particular, a user selection area 510 offers a choice of different stand interpretations (named "scenario" on the user interface). The user chooses the interpretation that is needed for answering his process related question. For example, he or she may choose to collect all containers that, through transformations, transitively are connected to the container the inquiry is addressed to. According to some embodiments, the server application is designed to be able to support other scenarios by just plugging in their implementation.

The user may choose the entry container in the selection area 510. As containers, branches in the version control system, derivate storages, test systems and other infrastructural elements are listed. Semantically related containers (e.g., a branch on the version control system and the corresponding derivate storage) may be grouped by naming convention or via attribution of the containers. According to some embodiments, the selection area 510 can further be used to select a scenario to display, including a linear history of a container, a transport history of a container, an integration history, a pure indirect history of a stand, an optionally selected date range, and/or a codeline.

After having chosen the interpretation and the entry container, the history of stand snippets is calculated. The stand information area 520 on the upper right-hand side shows stand snippets beginning on the top with the most current one in chronologically reverse order to the bottom. The displayed information of the stand snippet contains the name of the container (column "Home Container") that hosts the stand snippet, and the name of the container hosting the indirect predecessor together with the reference time (column "Source Container"). The column "Relation Type" reports on the type of transformation that caused the creation of the stand snippet. The column "Start Timestamp" tells the start time of the stand snippet. Finally, a stand snippet can get a freely chosen name that is displayed in the first column. Note that the stand information area 520 might display a name, a source container name or identifier, a relation type, a home container name or identifier, a transport/start timestamp, and/or an indication of whether or not the information is current.

A process step and/or log entry area 530 in the lower half of the right-hand side of the display 500 provides the process history of the stand generated by the sequence of stand snippets shown above. Process steps are displayed with start and end date. If a process step is still in execution, the entry "Running" may be shown. According to some embodiments, process steps are organized hierarchically, and they can be expanded on the front end such that sub process steps become visible. Additionally, every process step may carry an execution status which notifies on possible problems during process execution. Some information that might be displayed in the process step and/or log entry area 530 includes action information, status, a container name, a start date and time, an end date and time, attribute information, system information, and/or build result copy information.

Consider, for example, a first portion of source code that was created at a first development branch and a second portion of source code that was created at a second development branch. Moreover, these portions were compiled and combined at an integration branch and saved to a derivate storage server. The resulting product was then installed in a testing environment. In this case, different containers (each representing uniquely addressable physical locations in the landscape) may be associated with each version of the application (e.g., versions at the testing environment, the derivate storage server, and the first and second development branches). A user might then interact with the GUI display 500 and select the container associated with the testing environment (e.g., because a problem was detected at the testing environment). He or she may then ask to see information about prior versions (or containers) of the application that were associated with the selected contain. In this case, the system may automatically provide information to the user to help him or her find the appropriate source code at the appropriate development branch.

Thus, embodiments may improve the ability to maintain, track, and distribute different versions throughout a software production landscape. Moreover, one or more tools may be provided for a user that facilitate these abilities in an efficient and convenient manner.

The several embodiments described herein are solely for the purpose of illustration. Persons skilled in the art will recognize from this description other embodiments may be practiced with modifications and alterations limited only by the claims.

What is claimed is:

1. A method associated with a software production landscape, comprising:
   establishing a source version of a software product;
   associating a first container, representing a first uniquely addressable physical location in the software production landscape, with the source version;
   building an executable derivative version of the software product from the source version;
   associating a second container, representing a second uniquely addressable physical location in the software production landscape, with the executable derivative version;
   receiving, via a graphical user interface, input indicating a request for information about prior versions or containers that were associated with the second container; and
   automatically providing, to a user, software configuration information based at least in part on a relationship between the first and second containers at a given point in time;
   wherein the source version is a first portion of source code created at a first development branch;

the method further comprising:
   creating a second portion of source code at a second development branch;
   associating a third container, representing a third uniquely addressable physical location in the software production landscape, with the second portion of source code;
   installing the executable derivative version of the software product in an environment;
   associating a fourth container, representing a fourth uniquely addressable physical location in the software production landscape, with the executable derivative version installed in the environment; and
   receiving, via a graphical user interface, input indicating a request for information about prior versions or containers that were associated with the fourth container that represents the fourth uniquely addressable physical location in the software production landscape and is associated with the executable derivative version installed in the environment; and
   after receiving the input indicating a request for information about prior versions or containers that were associated with the fourth container that represents the fourth uniquely addressable physical location in the software production landscape and is associated with the executable derivative version installed in the environment, automatically providing information usable to find source code at a development branch.

2. The method of claim 1, wherein at least one of the containers comprises a directory within a software configuration management tool that hosts snapshots of the software product.

3. The method of claim 1, wherein at least one of the containers comprises a label defined in a software configuration management tool.

4. The method of claim 1, wherein at least one of the containers comprises a directory within a software configuration management tool along with a time stamp.

5. The method of claim 1, wherein at least one of the containers comprises a centrally accessible directory into which a build server places the executable derivative version.

6. The method of claim 1, wherein at least one of the containers comprises a directory into which a previously generated derivative version is copied.

7. The method of claim 1, wherein at least one of the containers comprises a runtime environment where a generated derivate version is executed.

8. The method of claim 1, further comprising:
   deploying the executable derivative version to a test environment, wherein another container, representing another uniquely addressable physical location in the software production landscape, is associated with the deployed executable derivative version in the test environment.

9. The method of claim 1, further comprising:
   deploying the executable derivative version to a run-time environment of a customer, wherein another container, representing another uniquely addressable physical location in the software production landscape, is associated with the deployed executable derivative version in the run-time environment.

10. The method of claim 1, further comprising:
    receiving, via a graphical user interface, a selection of a container from a user;
    providing, via the graphical user interface, information associated with another container based on the selected container.

11. The method of claim 1, wherein the second container includes a sequence of snapshots including different executable derivative versions.

12. The method of claim 11, wherein a transformation provides read access to a first snapshot in an input container and produces a second snapshot in an output container.

13. The method of claim 12, wherein the transformation comprises a transport such that the second snapshot is identical to the first snapshot.

14. The method of claim 1, wherein said building the executable derivative version of the software product is associated with integration of multiple elements from development branches.

15. The method of claim 1, further comprising:
after receiving the input indicating a request for information about prior versions or containers that were associated with the fourth container that represents the fourth uniquely addressable physical location in the software production landscape and is associated with the executable derivative version installed in the environment, automatically providing information to the user to help the user find appropriate source code at an appropriate development branch.

16. The method of claim 1, further comprising:
assigning a stand snippet to the second container; and
receiving, via a graphical user interface, input indicating a request for a history of the stand snippet.

17. The method of claim 16, further comprising:
calculating a history of the stand snippet.

18. The method of claim 17, further comprising:
displaying the history of the stand snippet;
wherein displaying the history of the stand snippet comprises:
displaying a name of the second container and a name of the first container.

19. The method of claim 16, further comprising:
displaying the history of the stand snippet;
wherein displaying the history of the stand snippet comprises:
displaying a name of the second container and a name of the first container.

20. An apparatus, comprising:
an integration branch that includes hardware and is to establish a source version of a software product, wherein a first container, representing a first uniquely addressable physical location in a software production landscape, is associated with the source version;
a derivative storage element that includes hardware and is to receive an executable derivative version of the software product built from the source version, wherein a second container, representing a second uniquely addressable physical location in the software production landscape, is associated with the executable derivative version; and
an application server that includes hardware and is to: (i) receive input indicating a request for information about prior versions or containers that were associated with the second container and (ii) automatically provide, to a user, software configuration information based at least in part on a relationship between the first and second containers at a given point in time;
wherein the source version is a first portion of source code created at a first development branch;
wherein a second portion of source code is created at a second development branch;
wherein a third container, representing a third uniquely addressable physical location in the software production landscape, is associated with the second portion of source code;
wherein the executable derivative version of the software product is installed in an environment; and
wherein a fourth container, representing a fourth uniquely addressable physical location in the software production landscape, is associated with the executable derivative version installed in the environment;
the apparatus further comprising:
a graphical user interface to: (i) receive input indicating a request for information about prior versions or containers that were associated with the fourth container that represents the fourth uniquely addressable physical location in the software production landscape and is associated with the executable derivative version installed in the environment, and (ii) after receiving the input indicating a request for information about prior versions or containers that were associated with the fourth container that represents the fourth uniquely addressable physical location in the software production landscape and is associated with the executable derivative version installed in the environment, automatically provide information usable to find source code at a development branch.

21. The apparatus of claim 20, further comprising a process log tool core to facilitate an exchange of information with the user.

22. A non transitory computer-readable medium storing processor-executable process steps that, when executed by a processor, perform a method, wherein the method comprises:
establishing a source version of a software product;
associating a first container, representing a first uniquely addressable physical location in a software production landscape, with the source version;
building an executable derivative version of the software product from the source version;
associating a second container, representing a second uniquely addressable physical location in the software production landscape, with the executable derivative version;
receiving, via a graphical user interface, input indicating a request for information about prior versions or containers that were associated with the second container; and
automatically providing, to a user, software configuration information based at least in part on a relationship between the first and second containers at a given point in time;
wherein the source version is a first portion of source code created at a first development branch;
the method further comprising:
creating a second portion of source code at a second development branch;
associating a third container, representing a third uniquely addressable physical location in the software production landscape, with the second portion of source code;
installing the executable derivative version of the software product in an environment;
associating a fourth container, representing a fourth uniquely addressable physical location in the software production landscape, with the executable derivative version installed in the environment; and
receiving, via a graphical user interface, input indicating a request for information about prior versions or containers that were associated with the fourth container that represents the fourth uniquely addressable physical location in the software production landscape and is associated with the executable derivative version installed in the environment; and after receiving the input indicating a request for information about prior versions or containers that were associated with the fourth container that represents the fourth uniquely addressable physical location in the software production landscape and is associated with the executable derivative version installed in the environment, automatically providing information usable to find source code at a development branch.

23. The computer-readable medium of claim 22, wherein at least one of the containers comprises a directory within a software configuration management tool that hosts snapshots of the software product.

24. The computer-readable medium of claim 22, wherein at least one of the containers comprises a label defined in a software configuration management tool.

25. The computer-readable medium of claim 22, wherein at least one of the containers comprises a directory within a software configuration management tool along with a time stamp.

26. The computer-readable medium of claim 22, wherein at least one of the containers comprises a centrally accessible directory into which a build server places the executable derivative version.

* * * * *